US012729324B2

(12) United States Patent
Kim et al.

(10) Patent No.: US 12,729,324 B2
(45) Date of Patent: Sep. 8, 2026

(54) ADHESIVE FILM FOR SEMICONDUCTOR AND SEMICONDUCTOR PACKAGE USING THE SAME

(71) Applicant: LG CHEM, LTD., Seoul (KR)

(72) Inventors: Ki Beom Kim, Daejeon (KR); Min Su Jeong, Daejeon (KR); Jung Hak Kim, Daejeon (KR); Eun Byurl Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 74 days.

(21) Appl. No.: 18/723,113

(22) PCT Filed: Apr. 6, 2023

(86) PCT No.: PCT/KR2023/004633
§ 371 (c)(1),
(2) Date: Jun. 21, 2024

(87) PCT Pub. No.: WO2023/195788
PCT Pub. Date: Oct. 12, 2023

(65) Prior Publication Data

US 2025/0059405 A1 Feb. 20, 2025

(30) Foreign Application Priority Data

Apr. 7, 2022 (KR) ........................ 10-2022-0043420

(51) Int. Cl.
*B32B 41/00* (2006.01)
*C08K 3/36* (2006.01)
(Continued)

(52) U.S. Cl.
CPC .................. *C09J 7/30* (2018.01); *C08K 3/36* (2013.01); *C08K 5/5397* (2013.01); *C08K 7/18* (2013.01); *C09J 151/08* (2013.01); *C09J 163/00* (2013.01); *C09J 2203/326* (2013.01); *C09J 2301/208* (2020.08); *C09J 2301/312* (2020.08); *C09J 2301/416* (2020.08); *C09J 2451/00* (2013.01); *C09J 2467/00* (2013.01)

(58) Field of Classification Search
CPC . C09J 7/30; C09J 151/08; C09J 163/00; C09J 2203/326; C09J 2301/208; C09J 2301/312; C09J 2301/416; C09J 2451/00; C09J 2467/00; C09J 151/003; C09J 2301/1242; C09J 2433/00; C09J 2463/00; C09J 7/10; C09J 7/38; C08K 3/36; C08K 5/5397; C08K 7/18; C08F 265/06; C08F 283/10; C08F 222/103; C08F 222/1006; C08L 33/00; H01L 21/683; H01L 21/6836
USPC .................... 156/60, 64, 350, 351, 378, 379
See application file for complete search history.

(56) References Cited

U.S. PATENT DOCUMENTS

| | | | |
|---|---|---|---|
| 2022/0352116 | A1 | 11/2022 | Akiyoshi et al. |
| 2023/0234333 | A1 | 7/2023 | Nakazawa et al. |

FOREIGN PATENT DOCUMENTS

| | | | |
|---|---|---|---|
| CN | 113613892 | A | 11/2021 |
| JP | 2022-020338 | A | 2/2022 |

(Continued)

*Primary Examiner* — Michael N Orlando
*Assistant Examiner* — Joshel Rivera
(74) *Attorney, Agent, or Firm* — Bryan Cave Leighton Paisner LLP

(57) ABSTRACT

A film for bonding semiconductors, which easily controls the fillet while exhibiting excellent adhesion force, and can prevent a problem in which solder is melted and fused to a chip; and a semiconductor package using the same.

14 Claims, 1 Drawing Sheet

(51) Int. Cl.

| | |
|---|---|
| ***C08K 5/5397*** | (2006.01) |
| ***C08K 7/18*** | (2006.01) |
| ***C09J 7/30*** | (2018.01) |
| ***C09J 151/08*** | (2006.01) |
| ***C09J 163/00*** | (2006.01) |

(56) References Cited

FOREIGN PATENT DOCUMENTS

| | | | |
|---|---|---|---|
| KR | 10-1248008 | B1 | 3/2013 |
| KR | 10-2017-0102099 | A | 9/2017 |
| TW | 202147932 | A | 12/2021 |
| WO | 2020/184583 | A1 | 9/2020 |
| WO | 2021065517 | A1 | 4/2021 |
| WO | 2021-251386 | A1 | 12/2021 |
| WO | 2022-009846 | A1 | 1/2022 |

[FIG. 1]
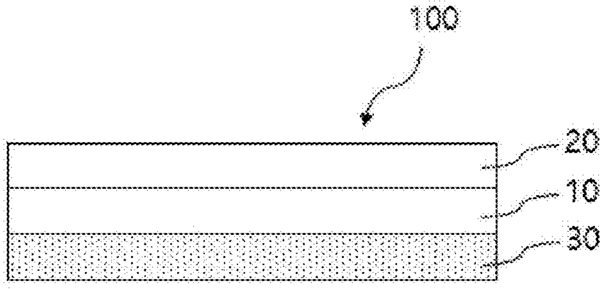
[FIG. 2]
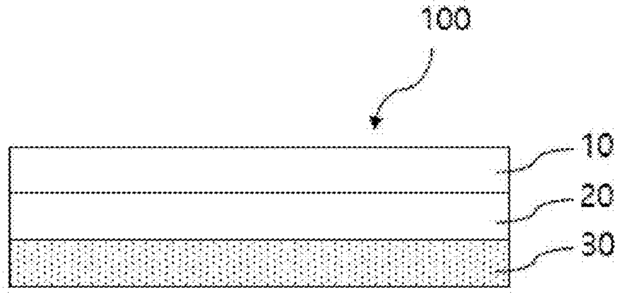
[FIG. 3]
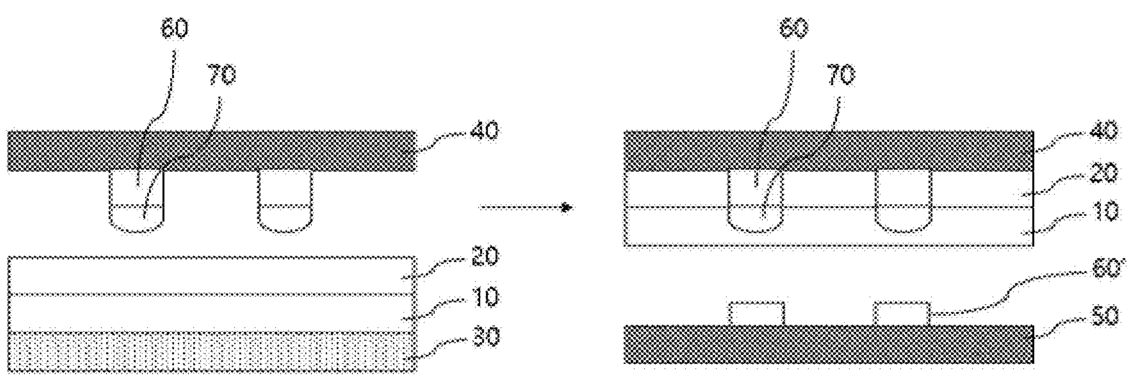

ADHESIVE FILM FOR SEMICONDUCTOR AND SEMICONDUCTOR PACKAGE USING THE SAME

CROSS-REFERENCE TO RELATED APPLICATION(S)

This application is a National Stage Application of International Application No. PCT/KR2023/004633 filed on Apr. 6, 2023, which claims priority to and the benefit of the filing date of Korean Patent Application No. 10-2022-0043420 filed in the Korean Intellectual Property Office on Apr. 7, 2022, the contents of which are hereby incorporated by reference in their entirety.

TECHNICAL FIELD

The present disclosure relates to a film for bonding semiconductors and a semiconductor package using the same.

BACKGROUND ART

In general, a manufacturing process of a semiconductor chip includes a process of forming a fine pattern on a wafer and a process of polishing and packaging the wafer so as to meet the specifications of a final device.

The above-described packaging process includes: a wafer inspection process of inspecting defects of semiconductor chips; a dicing process of cutting the wafer to separate it into individual chips; a die bonding process of attaching the separated chips to a circuit film or a mounting plate of a lead frame; a wire bonding process of connecting a chip pad provided on a semiconductor chip and a circuit pattern of the circuit film or lead frame with an electrical connection means such as a wire; a molding process of wrapping the outside with an encapsulant to protect the internal circuitry and other parts of the semiconductor chip; a trim process of cutting a dam bar connecting a lead and a lead; a forming process of bending the lead into a desired shape; and a finished product inspection process of inspecting defects of the finished package.

As the trend of miniaturization, high functionality, and high capacity of electronic devices has recently expanded, and the need for high density and high integration of semiconductor packages has rapidly increased accordingly, the size of semiconductor chips is gradually increasing, and stack package methods of stacking chips in multiple stages in order to improve the degree of integration are gradually increasing.

Recently, semiconductors using through-silicon vias (TSVs) have been developed, and the through-silicon vias have advantages of having high density, low power consumption and high speed, and enabling the thickness of packages to be minimized. Bonding between chips using the through-silicon vias is performed by a thermal compression bonding method in which pressure is applied for 2 to 10 seconds at a temperature of 200 to 300° C.

As an adhesive to be filled between the respective TSV layers, a non-conductive paste (NCP) in the form of a paste or a non-conductive film (NCF) is used. Among them, NCF is an underfill material in the form of a film and has advantages in embedding, process time, and ease. However, in the case of NCF, a fillet is inevitably generated during the compression process. When the fillet is discharged excessively, a problem in which the fillet flows downward or rises upward may occur in a structure in which several sheets of the chips are piled up.

In order to solve the above problems, it is necessary to develop a film for bonding semiconductors capable of effectively controlling the fillet.

SUMMARY OF INVENTION

Technical Problem

An object of the present disclosure is to provide a film for bonding semiconductors and a semiconductor package that can effectively control a fillet generated in a semiconductor packaging process while having excellent adhesive strength.

However, the problems to be solved by the present disclosure are not limited to the above-mentioned problem, and other problems not mentioned will be clearly understood by those skilled in the art from the following description.

Solution to Problem

One embodiment of the present disclosure provides a film for bonding semiconductors, including: a first adhesive layer containing a first adhesive composition comprising a first thermosetting resin, a first thermoplastic resin, and a first thermal curing agent; and a second adhesive layer which is provided on the first adhesive layer and contains a second adhesive composition comprising a second thermosetting resin, a second thermoplastic resin, a second thermal curing agent, a photopolymerizable monomer containing one or more photocurable functional groups, and a photoinitiator.

Another embodiment of the present disclosure provides a semiconductor package including the film for bonding semiconductors.

Advantageous Effects

The film for bonding semiconductors according to one embodiment of the present disclosure easily controls the fillet generated in the semiconductor packaging process while exhibiting excellent adhesive force, and can prevent a problem in which solder is melted and fused to a chip.

The semiconductor package according to one embodiment of the present disclosure may have excellent quality.

Effects of the present disclosure are not limited to the above-mentioned effects, and effects not mentioned will be clearly understood by those skilled in the art from the present specification and accompanying drawings.

BRIEF DESCRIPTION OF THE DRAWINGS

FIG. 1 is a view schematically showing a film for bonding semiconductors according to one embodiment of the present disclosure.

FIG. 2 is a view schematically showing a film for bonding semiconductors according to one embodiment of the present disclosure.

FIG. 3 is a view schematically showing a method for manufacturing a semiconductor package in Example 1 of the present disclosure.

DETAILED DESCRIPTION

In the present specification, when a part is said to "include" a certain component, it means that it may further include other components without excluding other components unless specifically stated otherwise.

Throughout the present specification, when a member is said to be located "on" other member, this includes not only a case where a member is in contact with other member, but also a case where another member exists between the two members.

Throughout the present specification, the unit "parts by weight" may mean the ratio of the weight of each component.

Throughout the present specification, "(meth)acrylate" is used as a generic meaning of referring to acrylate and methacrylate.

Throughout the present specification, terms including ordinal numbers such as "first" and "second" are used for the purpose of distinguishing one component from other component, and are not limited by the ordinal number. For example, within the scope of the rights of the invention, a first component may also be referred to as a second component, and similarly, a second component may be referred to as a first component.

Throughout the present specification, "solid content" is used as a generic meaning of referring to summing all components except for the solvent in the composition.

Hereinafter, the present specification will be described in more detail.

One embodiment of the present disclosure provides a film for bonding semiconductors, including: a first adhesive layer containing a first adhesive composition comprising a first thermosetting resin, a first thermoplastic resin, and a first thermal curing agent; and a second adhesive layer which is provided on the first adhesive layer and contains a second adhesive composition comprising a second thermosetting resin, a second thermoplastic resin, a second thermal curing agent, a photopolymerizable monomer containing one or more photocurable functional groups, and a photoinitiator.

The film for bonding semiconductors according to one embodiment of the present disclosure easily controls the fillet generated in the semiconductor packaging process while exhibiting excellent adhesive force, and can prevent a problem in which solder is melted and fused to a chip. Specifically, the film for bonding semiconductors includes a first adhesive layer that is thermally cured and a second adhesive layer that is thermally cured and photocured so that excellent adhesive force can be realized, the amount of a fillet generated in the semiconductor packaging process can be appropriately controlled, and a problem in which a solder melted at high temperatures flows to be fused to the chip can be effectively prevented.

Hereinafter, the adhesive layer and the adhesive composition included in the film for bonding semiconductors according to one embodiment of the present disclosure will be each described in detail.

(1) First Adhesive Layer

According to one embodiment of the present disclosure, the first adhesive layer may contain the first adhesive composition. Specifically, the first adhesive layer may include a dried product (or thermally cured product) of the first adhesive composition. The first adhesive composition may comprise a first thermosetting resin, a first thermoplastic resin, and a first thermal curing agent. Further, as described later, the first adhesive composition may further comprise a first inorganic filler, a first flux agent, and a first curing catalyst.

According to one embodiment of the present disclosure, the first thermosetting resin may include at least one of a solid epoxy resin and a liquid epoxy resin. The first thermosetting resin may react with the first thermal curing agent to exhibit heat resistance or mechanical strength.

According to one embodiment of the present disclosure, the epoxy resin may include at least one resin selected from among cresol novolac epoxy resins, bisphenol F type epoxy resins, bisphenol F type novolac epoxy resins, bisphenol A type epoxy resins, bisphenol A type novolac epoxy resins, phenol novolac epoxy resins, tetrafunctional epoxy resins, biphenyl type epoxy resins, biphenyl type novolac epoxy resins, triphenol methane type epoxy resins, alkyl-modified triphenol methane epoxy resins, naphthalene type epoxy resins, dicyclopentadiene type epoxy resins, dicyclopentadiene-modified phenol type epoxy resins, glycidylamine-type epoxy resins, and cycloaliphatic epoxy resins. When the first thermosetting resin includes the above-described epoxy resin, the first adhesive composition may implement a film for bonding semiconductors in which physical properties, heat resistance, and mechanical properties such as impact resistance that are suitable for a multi-layered structure package of semiconductor chips are secured.

According to one embodiment of the present disclosure, the epoxy resin may have an average epoxy equivalent of 100 g/eq to 1,000 g/eq. The average epoxy equivalent may be obtained based on the weight ratio and epoxy equivalent of each epoxy resin included in the above-mentioned epoxy resins.

According to one embodiment of the present disclosure, the first thermosetting resin may be included in an amount of 20 parts by weight or more to 40 parts by weight or less based on 100 parts by weight of the solid content of the first adhesive composition. At this time, the solid content of the first adhesive composition means all components except for the solvent, and specifically, one composed of the first thermosetting resin, the first thermoplastic resin, the first thermal curing agent, the first inorganic filler, the first flux agent, and the first curing catalyst. When the amount of the first thermosetting resin is within the above-described range, the first adhesive composition may implement a film for bonding semiconductors in which physical properties, heat resistance, and mechanical properties such as impact resistance that are suitable for a multi-layered structure package of semiconductor chips are secured.

According to one embodiment of the present disclosure, the first thermoplastic resin may include at least one resin selected from among a polyimide-based resin, a polyether imide-based resin, a polyester imide-based resin, a polyamide-based resin, a polyether sulfone-based resin, a polyether ketone-based resin, a polyolefin-based resin, a polyvinyl chloride-based resin, a phenoxy-based resin, butadiene rubber, styrene-butadiene rubber, modified butadiene rubber, reactive butadiene acrylonitrile copolymer rubber, and a (meth)acrylate-based resin. It may be possible to increase the compatibility with the epoxy resin and decrease stress generated in a semiconductor package by selecting the thermoplastic resin from the above-described ones.

According to one embodiment of the present disclosure, the first thermoplastic resin may include a (meth)acrylate-based resin having a glass transition temperature of −10° C. to 30° C. and a weight average molecular weight of 50,000 g/mol to 1,000,000 g/mol.

According to one embodiment of the present disclosure, the (meth)acrylate-based resin is an epoxy group-containing acrylic copolymer, and glycidyl acrylate or glycidyl methacrylate may be included in an amount of 1% by weight to 30% by weight, or 2% by weight to 28% by weight, or 2.5% by weight to 25% by weight of the total weight. When the epoxy group is included in the (meth)acrylate-based resin within the above-described range, compatibility and adhesive force with the epoxy resin may be excellent. In addition, since the viscosity rise rate due to curing is appropriate, bonding and embedding of solder bumps may be sufficiently performed in a thermal compression process of a semiconductor device.

According to one embodiment of the present disclosure, the first thermoplastic resin may be included in an amount of 5 parts by weight or more to 20 parts by weight or less based on 100 parts by weight of the solid content of the first adhesive composition. Compatibility with the first thermosetting resin may be increased and stress that may be generated in the semiconductor package may be effectively decreased by adjusting the amount of the first thermoplastic resin within the above-described range.

In addition, the first thermoplastic resin may include two types of (meth)acrylate-based resins. That is, the first thermoplastic resin may include a first (meth)acrylate-based resin and a second (meth)acrylate-based resin. The first (meth)acrylate-based resin and the second (meth)acrylate-based resin may have different weight average molecular weights. For example, the first (meth)acrylate-based resin may have a weight average molecular weight of 50,000 g/mol to 500,000 g/mol, and the second (meth)acrylate-based resin may have a weight average molecular weight of 550,000 g/mol to 1,000,000 g/mol. The first (meth)acrylate-based resin and the second (meth)acrylate-based resin included in the first thermoplastic resin may have a weight ratio of 0.1:10 to 10:0.1. When the weight ratio of the first (meth)acrylate-based resin and the second (meth)acrylate-based resin is within the above-described range, compatibility with the first thermosetting resin may be increased, and stress that may be generated in the semiconductor package may be effectively reduced.

According to one embodiment of the present disclosure, the first thermal curing agent may include at least one agent selected from among an amine-based compound, an acid anhydride-based compound, an amide-based compound, and a phenolic compound. Specifically, the amine-based compound may be one selected from the group consisting of diaminodiphenylmethane, diethylenetriamine, triethylenetetramine, diaminodiphenyl sulfone, isophoronediamine, and combinations thereof. The acid anhydride-based compound may be one selected from the group consisting of phthalic anhydride, trimellitic anhydride, pyromellitic dianhydride, maleic anhydride, tetrahydrophthalic anhydride, methyltetrahydrophthalic anhydride, methylnadic anhydride, hexahydrophthalic anhydride, methylhexahydrophthalic anhydride, and combinations thereof. The amide-based compound may be a polyamide resin synthesized from dicyandiamide, a linolenic acid dimer, and ethylenediamine. The phenolic compound may be: polyhydric phenols such as bisphenol A, bisphenol F, bisphenol S, fluorene bisphenol, and terpene diphenol; phenolic resins obtained by condensation of phenols with aldehydes, ketones, dienes, or the like; modified products of phenols and/or phenolic resins; halogenated phenols such as tetrabromobisphenol A, brominated phenol resin, and the like; other imidazoles; BF3-amine complexes; and guanidine derivatives. In addition, the phenolic compound may include at least one of a bisphenol A novolac resin and a cresol novolac resin. It may be possible to control the curing degree of the epoxy resin and improve mechanical properties of the first adhesive layer at the same time by selecting the curing agent from the above-described ones.

According to one embodiment of the present disclosure, the first thermal curing agent may include a phenolic resin having a softening point of 60° C. or more. Specifically, the phenolic resin may have a softening point of 60° C. or more to 150° C. or less, 65° C. or more to 145° C. or less, or 70° C. or more to 140° C. or less. It may be possible to improve heat resistance, strength, and adhesive properties after curing of the first adhesive composition, and prevent voids from being formed inside the adhesive layer in the semiconductor manufacturing process by including a phenolic resin having a softening point within the above-described range.

According to one embodiment of the present disclosure, the first thermal curing agent may include a novolac-based phenolic resin. The novolac-based phenolic resin has a chemical structure in which a ring is positioned between reactive functional groups. Due to these structural characteristics, the novolac-based phenolic resin may further lower hygroscopicity of the adhesive layer and further increase stability in a high-temperature compression process, thereby serving to prevent a peeling phenomenon or the like of the first adhesive layer.

According to one embodiment of the present disclosure, the first thermal curing agent may be included in an amount of 7.5 parts by weight or more to 17.5 parts by weight or less based on 100 parts by weight of the solid content of the first adhesive composition. It may be possible to improve heat resistance, strength, and adhesive properties of the first adhesive composition after curing by adjusting the amount of the first thermal curing agent within the above-described range.

According to one embodiment of the present disclosure, the first adhesive composition may further comprise an additive including at least one of a first inorganic filler, a first curing catalyst, and a first flux agent.

According to one embodiment of the present disclosure, the first inorganic filler may include at least one filler selected from among alumina, silica, barium sulfate, magnesium hydroxide, magnesium carbonate, magnesium silicate, magnesium oxide, calcium silicate, calcium carbonate, calcium oxide, aluminum hydroxide, aluminum nitride, and aluminum borate.

According to one embodiment of the present disclosure, the first inorganic filler may be an ion adsorbent capable of improving reliability by adsorbing ionic impurities. Specifically, one or more types of inorganic particles selected from the group consisting of magnesium-based inorganic materials such as magnesium hydroxide, magnesium carbonate, magnesium silicate, and magnesium oxide, calcium silicate, calcium carbonate, calcium oxide, alumina, aluminum hydroxide, aluminum nitride, aluminum borate whiskers, zirconium-based inorganic materials, and antimony bismuth-based inorganic materials may be applied as the ion adsorbent.

According to one embodiment of the present disclosure, the first inorganic filler may have a particle diameter (based on the longest outer diameter) of 0.01 to 10 μm, 0.02 to 5.0 μm, or 0.03 to 2.0 μm. It may be possible to prevent excessive agglomeration of the first adhesive composition and prevent damage to the semiconductor circuit and decrease in adhesive properties of the film for bonding semiconductors due to the inorganic filler by adjusting the particle diameter of the first inorganic filler within the above-described range.

In addition, the first inorganic filler may include two or more types of inorganic fillers having different particle diameters. That is, the first inorganic filler may include a 1-1 inorganic filler having a particle diameter of 10 nm or more to 300 nm or less and a 1-2 inorganic filler having a particle diameter of 310 nm or more to 10,000 nm or less. In this case, the 1-1 inorganic filler and the 1-2 inorganic filler included in the first inorganic filler may have a weight ratio of 0.1:10 to 10:0.1. When the weight ratio of the 1-1 inorganic filler and the 1-2 inorganic filler is within the above-described range, it may be possible to prevent excessive agglomeration of the first adhesive composition and prevent damage to the semiconductor circuit and decrease in adhesive properties of the film for bonding semiconductors due to the inorganic filler.

According to one embodiment of the present disclosure, the first inorganic filler may be included in an amount of 25 parts by weight or more to 70 parts by weight or less based on 100 parts by weight of the solid content of the first adhesive composition. It may be possible to prevent excessive agglomeration of the first adhesive composition and prevent damage to the semiconductor circuit and decrease in adhesive properties of the film for bonding semiconductors due to the inorganic filler by adjusting the amount of the first inorganic filler in the above-described range.

According to one embodiment of the present disclosure, the first curing catalyst may include one selected from the group consisting of a phosphorus-based compound, a boron-based compound, a phosphorus-boron based compound, an imidazole-based compound, and combinations thereof. It may be possible to accelerate curing of the first adhesive composition by selecting the first curing catalyst from the above-described ones.

According to one embodiment of the present disclosure, the first curing catalyst may be included in an amount of 1 part by weight or more to 3 parts by weight or less based on 100 parts by weight of the solid content of the first adhesive composition. It may be possible to accelerate curing of the first adhesive composition by adjusting the amount of the first curing catalyst in the above-described range.

According to one embodiment of the present disclosure, the functional group of the first flux agent may be a polar functional group. It may be possible to effectively control the fillet and contribute to improving the quality of a prepared film for bonding semiconductors by selecting a polar functional group as the functional group of the first flux agent.

According to one embodiment of the present disclosure, the polar functional group may be a carboxyl group. It may be possible to effectively control the fillet and contribute to improving the quality of the prepared film for bonding semiconductors by selecting a carboxyl group as the polar functional group as described above.

According to one embodiment of the present disclosure, the first flux agent may be included in an amount of 1 part by weight or more to 5 parts by weight or less based on 100 parts by weight of the solid content of the first adhesive composition. It may be possible to effectively control the fillet and contribute to improving the quality of the prepared film for bonding semiconductors by adjusting the amount of the first flux agent in the above-described range.

According to one embodiment of the present disclosure, the first adhesive composition may further comprise a leveling agent, a dispersing agent, or a solvent, if necessary.

According to one embodiment of the present disclosure, the solvent may be used for the purpose of dissolving the first adhesive composition and imparting a viscosity to the extent that is suitable for application of the composition. Specific examples of the solvent may include: ketones such as methyl ethyl ketone, cyclohexanone, and the like; aromatic hydrocarbons such as toluene, xylene, tetramethylbenzene, and the like; glycol ethers (Cellosolve) such as ethylene glycol monoethyl ether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether, triethylene glycol monoethyl ether, and the like; acetate esters such as ethyl acetate, butyl acetate, ethylene glycol monoethyl ether acetate, ethylene glycol monobutyl ether acetate, diethylene glycol monoethyl ether acetate, dipropylene glycol monomethyl ether acetate, and the like; alcohols such as ethanol, propanol, ethylene glycol, propylene glycol, carbitol, and the like; aliphatic hydrocarbons such as octane, decane, and the like; petroleum-based solvents such as petroleum ether, petroleum naphtha, hydrogenated petroleum naphtha, solvent naphtha, and the like; amides such as dimethylacetamide, dimethylformamide (DMF), and the like; etc. These solvents may be used alone or in a mixture of two or more thereof.

The solvent may be used in an appropriate amount in consideration of dispersibility, solubility, viscosity, or the like of the first adhesive composition, and for example, the first adhesive composition may contain 0.1% by weight to 70% by weight or 1% by weight to 65% by weight of the solvent. When the amount of the solvent is within the above-described range, coating properties of the first adhesive composition may be improved, and drying of the first adhesive composition may be smoothly performed, thereby reducing the stickiness of the prepared film.

Meanwhile, examples of a method for preparing the first adhesive composition are not greatly limited, but a method of mixing the above-described components by various methods, for example, using a mixer or the like may be used.

According to one embodiment of the present disclosure, the first adhesive layer may have a thickness of 1 μm or more to 100 μm or less. Specifically, the film for bonding semiconductors may have a thickness of 1 μm or more to 100 μm or less, 1 μm or more to 75 μm or less, 1 μm or more to 50 μm or less, 10 μm or more to 75 μm or less, 10 μm or more to 50 μm or less, 25 μm or more to 100 μm or less, 50 μm or more to 100 μm or less, 15 μm or more to 70 μm or less, or 20 μm or more to 50 μm or less.

(2) Second Adhesive Layer

According to one embodiment of the present disclosure, the second adhesive layer may contain the second adhesive composition. Specifically, the second adhesive layer may include a dried product (or thermally cured product) of the second adhesive composition. The second adhesive composition may comprise a second thermosetting resin, a second thermoplastic resin, a second thermal curing agent, a photopolymerizable monomer containing one or more photocurable functional groups, and a photoinitiator. The second adhesive layer may be additionally photocured when light is irradiated as will be described later by including the photopolymerizable monomer containing one or more photocurable functional groups, and the photoinitiator. Further, as described later, the second adhesive composition may further comprise a second inorganic filler, a second flux agent, and a second curing catalyst.

According to one embodiment of the present disclosure, the second thermosetting resin may include at least one of a solid epoxy resin and a liquid epoxy resin. The second thermosetting resin may react with the second thermal curing agent to exhibit heat resistance or mechanical strength. The second thermosetting resin may be the same as or different from the first thermosetting resin described above.

According to one embodiment of the present disclosure, the epoxy resin may include at least one resin selected from among cresol novolac epoxy resins, bisphenol F type epoxy resins, bisphenol F type novolac epoxy resins, bisphenol A type epoxy resins, bisphenol A type novolac epoxy resins, phenol novolac epoxy resins, tetrafunctional epoxy resins, biphenyl type epoxy resins, biphenyl type novolac epoxy resins, triphenol methane type epoxy resins, alkyl-modified triphenol methane epoxy resins, naphthalene type epoxy resins, dicyclopentadiene type epoxy resins, dicyclopentadiene-modified phenol type epoxy resins, glycidylamine-type epoxy resins, and cycloaliphatic epoxy resins. When the second thermosetting resin includes the above-described epoxy resin, the second adhesive composition may implement a film for bonding semiconductors in which physical properties, heat resistance, and mechanical properties such as impact resistance that are suitable for a multi-layered structure package of semiconductor chips are secured.

According to one embodiment of the present disclosure, the epoxy resin may have an average epoxy equivalent of 100 g/eq to 1,000 g/eq. The average epoxy equivalent may be obtained based on the weight ratio and epoxy equivalent of each epoxy resin included in the above-mentioned epoxy resins.

According to one embodiment of the present disclosure, the second thermosetting resin may be included in an amount of 20 parts by weight or more to 40 parts by weight or less based on 100 parts by weight of the solid content of the second adhesive composition. At this time, the solid content of the second adhesive composition means all components except for the solvent, and specifically, one composed of the second thermosetting resin, the second thermoplastic resin, the second thermal curing agent, the second inorganic filler, the second flux agent, the second curing catalyst, the photopolymerizable monomer, and the photoinitiator. When the amount of the second thermosetting resin is within the above-described range, the second adhesive composition may implement a film for bonding semiconductors in which physical properties, heat resistance, and mechanical properties such as impact resistance that are suitable for a multi-layered structure package of semiconductor chips are secured.

According to one embodiment of the present disclosure, the second thermoplastic resin may include at least one resin selected from among a polyimide-based resin, a polyether imide-based resin, a polyester imide-based resin, a polyamide-based resin, a polyether sulfone-based resin, a polyether ketone-based resin, a polyolefin-based resin, a polyvinyl chloride-based resin, a phenoxy-based resin, butadiene rubber, styrene-butadiene rubber, modified butadiene rubber, reactive butadiene acrylonitrile copolymer rubber, and a (meth)acrylate-based resin. It may be possible to increase the compatibility with the epoxy resin and decrease stress generated in a semiconductor package by selecting the second thermoplastic resin from the above-described ones. The second thermoplastic resin may be the same as or different from the first thermoplastic resin described above.

According to one embodiment of the present disclosure, the second thermoplastic resin may include a (meth)acrylate-based resin having a glass transition temperature of −10° C. to 30° C. and a weight average molecular weight of 50,000 g/mol to 1,000,000 g/mol.

According to one embodiment of the present disclosure, the (meth)acrylate-based resin is an epoxy group-containing acrylic copolymer, and glycidyl acrylate or glycidyl methacrylate may be included in an amount of 1% by weight to 30% by weight, or 2% by weight to 28% by weight, or 2.5% by weight to 25% by weight of the total weight. When the epoxy group is included in the (meth)acrylate-based resin within the above-described range, compatibility and adhesive force with the epoxy resin may be excellent. In addition, since the viscosity rise rate due to curing is appropriate, bonding and embedding of solder bumps may be sufficiently performed in a thermal compression process of a semiconductor device.

According to one embodiment of the present disclosure, the second thermoplastic resin may be included in an amount of 5 parts by weight or more to 20 parts by weight or less based on 100 parts by weight of the solid content of the second adhesive composition. Compatibility with the second thermosetting resin may be increased and stress that may be generated in the semiconductor package may be effectively decreased by adjusting the amount of the second thermoplastic resin within the above-described range.

In addition, the second thermoplastic resin may include two types of (meth)acrylate-based resins. That is, the second thermoplastic resin may include a first (meth)acrylate-based resin and a second (meth)acrylate-based resin. The first (meth)acrylate-based resin and the second (meth)acrylate-based resin may have different weight average molecular weights. For example, the first (meth)acrylate-based resin may have a weight average molecular weight of 50,000 g/mol to 500,000 g/mol, and the second (meth)acrylate-based resin may have a weight average molecular weight of 550,000 g/mol to 1,000,000 g/mol. The first (meth)acrylate-based resin and the second (meth)acrylate-based resin included in the second thermoplastic resin may have a weight ratio of 0.1:10 to 10:0.1. When the weight ratio of the first (meth)acrylate-based resin and the second (meth)acrylate-based resin is within the above-described range, compatibility with the second thermosetting resin may be increased, and stress that may be generated in the semiconductor package may be effectively reduced.

According to one embodiment of the present disclosure, the second thermal curing agent may include at least one agent selected from among an amine-based compound, an acid anhydride-based compound, an amide-based compound, and a phenolic compound. Specifically, the amine-based compound may be one selected from the group consisting of diaminodiphenylmethane, diethylenetriamine, triethylenetetramine, diaminodiphenyl sulfone, isophoronediamine, and combinations thereof. The acid anhydride-based compound may be one selected from the group consisting of phthalic anhydride, trimellitic anhydride, pyromellitic dianhydride, maleic anhydride, tetrahydrophthalic anhydride, methyltetrahydrophthalic anhydride, methylnadic anhydride, hexahydrophthalic anhydride, methylhexahydrophthalic anhydride, and combinations thereof. The amide-based compound may be a polyamide resin synthesized from dicyandiamide, a linolenic acid dimer, and ethylenediamine. The phenolic compound may be: polyhydric phenols such as bisphenol A, bisphenol F, bisphenol S, fluorene bisphenol, and terpene diphenol; phenolic resins obtained by condensation of phenols with aldehydes, ketones, dienes, or the like; modified products of phenols and/or phenolic resins; halogenated phenols such as tetrabromobisphenol A, brominated phenol resin, and the like; other imidazoles; BF3-amine complexes; and guanidine derivatives. In addition, the phenolic compound may include at least one of a bisphenol A novolac resin and a cresol novolac resin. It may be possible to control the curing degree of the epoxy resin and improve mechanical properties of the second adhesive layer at the same time by selecting the curing agent from the above-described ones. The second thermal curing agent may be the same as or different from the first thermal curing agent described above.

According to one embodiment of the present disclosure, the second thermal curing agent may include a phenolic resin having a softening point of 60° C. or more. Specifically, the phenolic resin may have a softening point of 60° C. or more to 150° C. or less, 65° C. or more to 145° C. or less, or 70° C. or more to 140° C. or less. It may be possible to improve heat resistance, strength, and adhesive properties after curing of the second adhesive composition, and prevent voids from being formed inside the adhesive layer in the semiconductor manufacturing process by including a phenolic resin having a softening point within the above-described range.

According to one embodiment of the present disclosure, the second thermal curing agent may include a novolac-based phenolic resin. The novolac-based phenolic resin has a chemical structure in which a ring is positioned between reactive functional groups. Due to these structural characteristics, the novolac-based phenolic resin may further lower hygroscopicity of the adhesive layer and further increase stability in a high-temperature compression process, thereby serving to prevent a peeling phenomenon or the like of the adhesive layer.

According to one embodiment of the present disclosure, the second thermal curing agent may be included in an amount of 7.5 parts by weight or more to 17.5 parts by weight or less based on 100 parts by weight of the solid content of the second adhesive composition. It may be possible to improve heat resistance, strength, and adhesive properties of the second adhesive composition after curing by adjusting the amount of the second thermal curing agent within the above-described range.

According to one embodiment of the present disclosure, the photopolymerizable monomer may contain one or more photocurable functional groups. According to one embodiment of the present disclosure, the photopolymerizable monomer may include a (meth)acrylate-based compound containing one or more photocurable functional groups. Specifically, the photopolymerizable monomer may include at least one group selected from among a hydroxyl group-containing (meth)acrylate-based compound, a water-soluble (meth)acrylate-based compound, a polyester (meth)acrylate-based compound, a polyurethane (meth)acrylate-based compound, an epoxy (meth)acrylate-based compound, and a caprolactone-modified (meth)acrylate-based compound.

More specifically, the photopolymerizable monomer may include one or more compounds selected from the group consisting of a hydroxyl group-containing (meth)acrylate-based compound such as 2-hydroxyethyl (meth)acrylate, 2-hydroxypropyl (meth)acrylate, pentaerythritol tri(meth) acrylate, dipentaerythritol penta(meth)acrylate, or the like; a water-soluble (meth)acrylate-based compound such as polyethylene glycol di(meth)acrylate, polypropylene glycol di(meth)acrylate, or the like; a polyfunctional polyester (meth)acrylate-based compound of a polyhydric alcohol such as trimethylolpropane tri(meth)acrylate, trimethylolpropane ethoxylate tri(meth)acrylate, pentaerythritol tetra (meth)acrylate, dipentaerythritol hexa(meth)acrylate, or the like; a (meth)acrylate-based compound of an ethylene oxide adduct and/or a propylene oxide adduct of a polyfunctional alcohol such as trimethylolpropane, hydrogenated bisphenol A, or the like, or a polyhydric phenol such as bisphenol A, biphenol, or the like; a polyfunctional or monofunctional polyurethane (meth)acrylate-based compound that is an isocyanate-modified product of the hydroxyl group-containing (meth)acrylate; an epoxy (meth)acrylate-based compound that is a (meth)acrylic acid adduct of bisphenol A diglycidyl ether, hydrogenated bisphenol A diglycidyl ether, or a phenol novolac epoxy resin; a photosensitive (meth)acrylate compound of a caprolactone-modified (meth)acrylate-based compound or the like such as caprolactone-modified ditrimethylolpropane tetra(meth)acrylate, ε-caprolactone modified dipentaerythritol (meth)acrylate, caprolactone-modified hydroxypivalic acid neopentyl glycol ester di(meth)acrylate, or the like, and these may also be used alone or in combination of two or more thereof. In addition, the photopolymerizable monomer may include at least one of trimethylolpropane ethoxylate triacrylate and dipentaerythritol hexaacrylate.

According to one embodiment of the present disclosure, the photopolymerizable monomer may be included in an amount of 0.5 parts by weight or more to 5 parts by weight or less based on 100 parts by weight of the solid content of the second adhesive composition. When the photopolymerizable monomer is included in the above-described range, it may be possible to prepare a film for bonding semiconductors, which easily controls the fillet while exhibiting excellent adhesive force.

According to one embodiment of the present disclosure, the photoinitiator serves to initiate radical photocuring of the second adhesive composition. The photoinitiator may include known photoinitiators, and may include materials including: benzoin and its alkyl ethers, such as benzoin, benzoin methyl ether, and benzoin ethyl ether; acetophenones such as acetophenone, 2,2-dimethoxy-2-phenylacetophenone, 1,1-dichloroacetophenone, and 4-(1-t-butyldioxy-1-methylethyl) acetophenone; anthraquinones such as 2-methylanthraquinone, 2-amylanthraquinone, 2-t-butylanthraquinone, and 1-chloroanthraquinone; thioxanthones such as 2,4-dimethylthioxanthone, 2,4-diisopropylthioxanthone, and 2-chlorothioxanthone; ketals such as acetophenone dimethyl ketal and benzyl dimethyl ketal; benzophenones such as benzophenone, 4-(1-t-butyldioxy-1-methylethyl)benzophenone and 3,3',4,4'-tetrakis(t-butyldioxycarbonyl)benzophenone. In addition, α-aminoacetophenones such as 2-methyl-1-[4-(methylthio) phenyl]-2-morpholinopropanone-1,2-benzyl-2-dimethylamino-1-(4-morpholinophenyl)-butane-1-one, 2-(dimethylamino)-2-[(4-methylphenyl)methyl]-1-[4-(4-morpholinyl) phenyl]-1-butanone, and N,N-dimethylaminoacetophenone (Commercially available products include Irgacure (registered trademark) 907, Irgacure 369, and Irgacure 379 produced by Chiba Specialty Chemicals (currently, Chiba Japan)), acylphosphine oxides such as 2,4,6-trimethylbenzoyldiphenylphosphine oxide, bis(2,4,6-trimethylbenzoyl)-phenylphosphine oxide, and bis(2,6-dimethoxybenzoyl)-2,4,4-trimethyl-pentylphosphine oxide (Commercially available products include Lucirin (registered trademark) TPO produced by BASF and Irgacure 819 produced by Ciba Specialty Chemicals), etc. may be mentioned as a preferable photoinitiator.

In addition, oxime esters may be mentioned as a preferable photoinitiator. Specific examples of oxime esters may include 2-(acetyloxyiminomethyl)thioxanthen-9-one, (1,2-octanedione, 1-[4-(phenylthio)-phenyl]-, 2-(O-benzoyloxime)), (ethanone, 1-[9-ethyl-6-(2-methylbenzoyl)-9H-carbazol-3-yl]-, 1-(O-acetyloxime)) and the like. Commercially available products thereof may include GGI-325, Irgacure OXE01, and Irgacure OXE02 produced by Ciba Specialty Chemicals, N-1919 produced by ADEKA, and Darocur TPO produced by Ciba Specialty Chemicals. When the above-described types of photoinitiators are included, it may be possible to prepare a film for bonding semiconductors, which easily controls the fillet while exhibiting excellent adhesive force.

According to one embodiment of the present disclosure, the photoinitiator may be included in an amount of 0.5 parts by weight or more to 5 parts by weight or less based on 100 parts by weight of the solid content of the second adhesive composition. When the photoinitiator is included in the above-described range, it may be possible to prepare a film for bonding semiconductors, which easily controls the fillet while exhibiting excellent adhesive force. In addition, when the amount of the photoinitiator is within the above-described range, the second adhesive layer may be stably photocured when light is irradiated.

According to one embodiment of the present disclosure, the photoinitiator and the second thermal curing agent may have a weight ratio of 1:0.5 or more to 1:1000 or less. Specifically, the photoinitiator and the second thermal curing agent may have a weight ratio of 1:0.5 or more to 1:50 or less, 1:0.5 or more, 1:1 or more, 1:5 or more, 1:10 or more, 1:20 or more, 1:30 or more, 1:50 or more, or 1:100 or more. Specifically, the photoinitiator and the second thermal curing agent may have a weight ratio of 1:1,000 or less, 1:900 or less, 1:800 or less, 1:700 or less, 1:600 or less, or 1:500 or less. When the weight ratio of the photoinitiator and the second thermal curing agent has a value within the above-described range, the second adhesive composition may stably form a solid second adhesive layer by heat, and the second adhesive layer may be stably photocured by light irradiation. Through this, the film for bonding semiconductors can effectively control the fillet generated in the semiconductor packaging process while exhibiting excellent adhesive force.

According to one embodiment of the present disclosure, the second adhesive composition may further comprise an additive including at least one of a second inorganic filler, a second curing catalyst, and a second flux agent.

According to one embodiment of the present disclosure, the second inorganic filler may include at least one filler selected from among alumina, silica, barium sulfate, magnesium hydroxide, magnesium carbonate, magnesium silicate, magnesium oxide, calcium silicate, calcium carbonate, calcium oxide, aluminum hydroxide, aluminum nitride, and aluminum borate. The second inorganic filler may be the same as or different from the first inorganic filler described above.

According to one embodiment of the present disclosure, the second inorganic filler may be an ion adsorbent capable of improving reliability by adsorbing ionic impurities. Specifically, one or more types of inorganic particles selected from the group consisting of magnesium-based inorganic materials such as magnesium hydroxide, magnesium carbonate, magnesium silicate, and magnesium oxide, calcium silicate, calcium carbonate, calcium oxide, alumina, aluminum hydroxide, aluminum nitride, aluminum borate whiskers, zirconium-based inorganic materials, and antimony bismuth-based inorganic materials may be applied as the ion adsorbent.

According to one embodiment of the present disclosure, the second inorganic filler may have a particle diameter (based on the longest outer diameter) of 0.01 to 10 μm, 0.02 to 5.0 μm, or 0.03 to 2.0 μm. It may be possible to prevent excessive agglomeration of the second adhesive composition and prevent damage to the semiconductor circuit and decrease in adhesive properties of the film for bonding semiconductors due to the inorganic filler by adjusting the particle diameter of the second inorganic filler within the above-described range.

In addition, the second inorganic filler may include two or more types of inorganic fillers having different particle diameters. That is, the second inorganic filler may include a 2-1 inorganic filler having a particle diameter of 10 nm or more to 300 nm or less and a 2-2 inorganic filler having a particle diameter of 310 nm or more to 10,000 nm or less. In this case, the 2-1 inorganic filler and the 2-2 inorganic filler included in the second inorganic filler may have a weight ratio of 0.1:10 to 10:0.1. When the weight ratio of the 2-1 inorganic filler and the 2-2 inorganic filler is within the above-described range, it may be possible to prevent excessive agglomeration of the second adhesive composition and prevent damage to the semiconductor circuit and decrease in adhesive properties of the film for bonding semiconductors due to the inorganic filler.

According to one embodiment of the present disclosure, the second inorganic filler may be included in an amount of 25 parts by weight or more to 70 parts by weight or less based on 100 parts by weight of the solid content of the second adhesive composition. It may be possible to prevent excessive agglomeration of the second adhesive composition and prevent damage to the semiconductor circuit and decrease in adhesive properties of the film for bonding semiconductors due to the inorganic filler by adjusting the amount of the second inorganic filler in the above-described range.

According to one embodiment of the present disclosure, the second curing catalyst may include one selected from the group consisting of a phosphorus-based compound, a boron-based compound, a phosphorus-boron based compound, an imidazole-based compound, and combinations thereof. It may be possible to accelerate curing of the second adhesive composition by selecting the curing catalyst from the above-described ones. The second curing catalyst may be the same as or different from the first curing catalyst described above.

According to one embodiment of the present disclosure, the second curing catalyst may be included in an amount of 1 part by weight or more to 3 parts by weight or less based on 100 parts by weight of the solid content of the second adhesive composition. It may be possible to accelerate curing of the second adhesive composition by adjusting the amount of the second curing catalyst in the above-described range.

According to one embodiment of the present disclosure, the functional group of the second flux agent may be a polar functional group. It may be possible to effectively control the fillet and contribute to improving the quality of a prepared film for bonding semiconductors by selecting a polar functional group as the functional group of the second flux agent. The second flux agent may be the same as or different from the first flux agent described above.

According to one embodiment of the present disclosure, the polar functional group may be a carboxyl group. It may be possible to effectively control the fillet and contribute to improving the quality of the prepared film for bonding semiconductors by selecting the polar functional group as a carboxyl group as described above.

According to one embodiment of the present disclosure, the second flux agent may be included in an amount of 1 part by weight or more to 5 parts by weight or less based on 100 parts by weight of the solid content of the second adhesive composition. It may be possible to effectively control the fillet and contribute to improving the quality of the prepared film for bonding semiconductors by adjusting the amount of the second flux agent in the above-described range.

According to one embodiment of the present disclosure, the second adhesive composition may further comprise a leveling agent, a dispersing agent, or a solvent, if necessary.

According to one embodiment of the present disclosure, the solvent may be used for the purpose of dissolving the second adhesive composition and imparting a viscosity to the extent that is suitable for application of the composition. Specific examples of the solvent may include: ketones such as methyl ethyl ketone, cyclohexanone, and the like; aromatic hydrocarbons such as toluene, xylene, tetramethylbenzene, and the like; glycol ethers (Cellosolve) such as ethylene glycol monoethyl ether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether, triethylene glycol monoethyl ether, and the like; acetate esters such as ethyl acetate, butyl acetate, ethylene glycol monoethyl ether acetate, ethylene glycol monobutyl ether acetate, diethylene glycol monoethyl ether acetate, dipropylene glycol monomethyl ether acetate, and the like; alcohols such as ethanol, propanol, ethylene glycol, propylene glycol, carbitol, and the like; aliphatic hydrocarbons such as octane, decane, and the like; petroleum-based solvents such as petroleum ether, petroleum naphtha, hydrogenated petroleum naphtha, solvent naphtha, and the like; amides such as dimethylacetamide, dimethylformamide (DMF), and the like; etc. These solvents may be used alone or in a mixture of two or more thereof.

The solvent may be used in an appropriate amount in consideration of dispersibility, solubility, viscosity, or the like of the second adhesive composition, and for example, the second adhesive composition may contain 0.1% by weight to 70% by weight or 1% by weight to 65% by weight of the solvent. When the amount of the solvent is within the above-described range, coating properties of the second adhesive composition may be improved, and drying of the second adhesive composition may be smoothly performed, thereby reducing the stickiness of the prepared film.

Meanwhile, examples of a method for preparing the second adhesive composition is not greatly limited, but a method of mixing the above-described components by various methods, for example, using a mixer or the like may be used.

According to one embodiment of the present disclosure, the second adhesive layer may have a thickness of 1 μm or more to 100 μm or less. Specifically, the film for bonding semiconductors may have a thickness of 1 μm or more to 100 μm or less, 1 μm or more to 75 μm or less, 1 μm or more to 50 μm or less, 10 μm or more to 75 μm or less, 10 μm or more to 50 μm or less, 25 μm or more to 100 μm or less, 50 μm or more to 100 μm or less, 15 μm or more to 70 μm or less, or 20 μm or more to 50 μm or less.

According to one embodiment of the present disclosure, the film for bonding semiconductors may further include a release film, and the first adhesive layer may be provided on the release film.

FIG. 1 is a view showing a film for bonding semiconductors according to one embodiment of the present disclosure.

Referring to FIG. 1, a film 100 for bonding semiconductors according to one embodiment of the present disclosure may include a release film 30, a first adhesive layer 10 provided on one surface of the release film 30, and a second adhesive layer 20 provided on one surface of the first adhesive layer 10.

That is, the film for bonding semiconductors may have a structure in which the release film 30, the first adhesive layer 10, and the second adhesive layer 20 are sequentially laminated. When the film for bonding semiconductors has a lamination structure of the above-mentioned order, since it is easy to control the fillet generated in the semiconductor packaging process, and it may be possible to prevent a problem in which solder is melted to be fused to a chip, quality reliability may be effectively improved.

According to one embodiment of the present disclosure, the film for bonding semiconductors may further include a release film, and the second adhesive layer may be provided on the release film.

FIG. 2 is a view showing a film for bonding semiconductors according to one embodiment of the present disclosure.

Referring to FIG. 2, the film 100 for bonding semiconductors according to one embodiment of the present disclosure may include a release film 30, a second adhesive layer 20 provided on one surface of the release film 30, and a first adhesive layer 10 provided on one surface of the second adhesive layer 20.

That is, the film 100 for bonding semiconductors may have a structure in which the release film 30, the second adhesive layer 20, and the first adhesive layer 10 are sequentially laminated.

Referring to FIGS. 1 and 2, the film 100 for bonding semiconductors may include a first adhesive layer 10 and a second adhesive layer 20 and may additionally include a release film 30.

According to one embodiment of the present disclosure, the film for bonding semiconductors means a film including: a first adhesive layer obtained through application and a drying or thermal curing process of the above-described first adhesive composition; and a second adhesive layer obtained through application and a drying or thermal curing process of the above-described second adhesive composition on the first adhesive layer, wherein the polymer included in the film for bonding semiconductors may include a reaction product obtained through a crosslinking reaction of components included in the first adhesive composition or the second adhesive composition. In addition, it may be possible to effectively control the fillet and easily prepare a film for bonding semiconductors having excellent quality through an additional curing process of irradiating light to the film for bonding semiconductors including the first adhesive layer and the second adhesive layer and photocuring it.

In the application step, conventional methods and devices known to be used for applying the first adhesive composition or the second adhesive composition may be used. For example, the first adhesive composition or second adhesive composition may be applied to a base film as it is, or after being diluted in an appropriate organic solvent, using a comma coater, a blade coater, a lip coater, a rod coater, a squeeze coater, a reverse coater, a transfer roll coater, a gravure coater, a spray coater, and the like, and then the applied first adhesive composition or second adhesive composition may be dried.

According to one embodiment of the present disclosure, the drying temperature may be 50° C. to 200° C. Specifically, the drying temperature may be 60° C. to 170° C., or 70° C. to 150° C. In addition, the drying time may be 2 minutes to 30 minutes. Specifically, the drying time may be 2.5 minutes to 25 minutes, 3 minutes to 20 minutes, or 3.5 minutes to 15 minutes.

According to one embodiment of the present disclosure, the first adhesive layer and the second adhesive layer may have different melt viscosities after light is irradiated to the film for bonding semiconductors. When the first adhesive layer and the second adhesive layer have different melt viscosities, the fillet can be effectively controlled through an additional curing process of performing photocuring by irradiating light, and a film for bonding semiconductors having excellent quality can be easily prepared.

According to one embodiment of the present disclosure, the first adhesive layer may have a melt viscosity of 100 to 2,000 Pa·s, and the second adhesive layer may have a melt viscosity of 200 to 5,000 Pa·s. At this time, the second adhesive layer has a melt viscosity measured after light exposure of 1,000 mJ. When the melt viscosities of the first adhesive layer and the second adhesive layer are within the above-described ranges, the fillet can be effectively controlled through an additional curing process of performing photocuring by irradiating light, and a film for bonding semiconductors having excellent quality can be easily prepared.

According to one embodiment of the present disclosure, the first adhesive layer and the second adhesive layer may have a thickness ratio of 1:9 to 9:1. Specifically, the first adhesive layer and the second adhesive layer may have a thickness ratio of 1:7 to 7:1, 1:5 to 5:1, or 1:3 to 3:1. When the thickness ratio in the above-described range is satisfied, the adhesive strength of the prepared film for bonding semiconductors can be effectively improved, and the fillet can be easily controlled.

According to one embodiment of the present disclosure, the release film for supporting the film for bonding semiconductors may include one, or two or more of plastic films such as a polyethylene terephthalate film, a polytetrafluoroethylene film, a polyethylene film, a polypropylene film, a polybutene film, a polybutadiene film, a vinyl chloride copolymer film, and a polyimide film.

According to one embodiment of the present disclosure, the surface of the release film may be subjected to release treatment with one, or two or more of an alkyd-based release agent, a silicone-based release agent, a fluorine-based release agent, an unsaturated ester-based release agent, a polyolefin-based release agent, and a wax-based release agent, and a release agent among them such as an alkyd-based release agent, a silicone-based release agent, or a fluorine-based release agent particularly having heat resistance is preferable.

According to one embodiment of the present disclosure, the thickness of the release film is not particularly limited, but may be 3 to 400 μm, 5 to 200 μm, or 10 to 150 μm.

One embodiment of the present disclosure provides a semiconductor package including the film for bonding semiconductors.

A semiconductor package according to one embodiment of the present disclosure may have excellent quality. Specifically, the structure of the film for bonding semiconductors is a two-layer structure and is fabricated in a heat-curing and photo-curing type, respectively, so that the fillet may be easily controlled, and a problem in which the solder is fused to the chip due to the fluidity generated when the solder melts at high temperatures may be prevented, thereby effectively improving quality reliability.

The film for bonding semiconductors may be used for bonding a semiconductor, and the semiconductor may include a circuit board and a semiconductor chip. The circuit board may include a printed circuit board (PCB), a semiconductor package board, or a flexible printed circuit board (FPCB).

EXAMPLES

Hereinafter, examples will be described in detail to explain the present disclosure in detail. However, the embodiments according to the present disclosure can be modified in many different forms, and the scope of the present disclosure is not construed as being limited to the examples described below. The embodiments in the present specification are provided to more completely explain the present disclosure to those skilled in the art.

Examples and Comparative Examples (Preparation of Composition for Bonding Semiconductors and Film for Bonding Semiconductors)

Samples

- Liquid epoxy resin (1): RE-310S (Nippon Kayaku Co., bisphenol A epoxy resin, epoxy equivalent of 180 g/eq)
- Liquid epoxy resin (2): LX-01 (OSAKASODA, epoxy equivalent of 180 g/eq)
- Solid epoxy resin (1): EOCN-104S (Nippon Kayaku Co, epoxy equivalent of 218 g/eq)
- Solid epoxy resin (2): EOCN-1020-70 (Nippon Kayaku Co, epoxy equivalent of 199 g/eq)
- Acrylate resin (1): KG-3015P (Negami Chemical Industrial Co., Ltd, Mw: 900,000, glass transition temperature: 10° C.)
- Acrylate resin (2): KG-3104 (Negami Chemical Industrial Co., Ltd, Mw: 120,000, glass transition temperature: 16° C.)
- Phenolic resin (1): KH-6021 (DIC, bisphenol A novolac resin, hydroxyl group equivalent of 121 g/eq, softening point of 133° C.)
- Phenolic resin (2): KA-1160 (DIC, cresol novolac resin, hydroxyl group equivalent of 117 g/eq, softening point of 85° C.)
- Inorganic filler (1): YA050C (Admatechs, spherical silica, average particle diameter of about 50 nm)
- Inorganic filler (2): SC-2050 (Admatechs, spherical silica, average particle diameter of about 500 nm)
- Flux agent (1): C3-CIC (SHIKOKU)
- Flux agent (2): adipic acid (Sigma Aldrich)
- Curing catalyst (1): C11Z-CN (SHIKOKU, imidazole-based curing catalyst)
- Curing catalyst (2): 2PZ (SHIKOKU, imidazole-based curing catalyst)
- Photopolymerizable monomer (1): M300 (Miwon Specialty Chemical, trimethylolpropane ethoxylate triacrylate)
- Photopolymerizable monomer (2): EM265 (ETERNAL CHEMICAL, dipentaerythritol hexaacrylate)
- Photoinitiator: TPO (iGM RESINS, 2,4,6-trimethylbenzoyldiphenylphosphine oxide)

Preparation of First Adhesive Compositions

Preparation of First Adhesive Composition (1)

A first thermosetting resin was prepared by mixing RE-310S as a liquid epoxy resin and EOCN-104S as a solid epoxy resin. In addition, KG-3015, an acrylate resin, was prepared as a first thermoplastic resin, and KH-6021, a phenolic resin, was prepared as a first thermal curing agent.

In addition, YA050C as the first inorganic filler and C3-CIC as the first flux agent were prepared. In addition, C11Z-CN, an imidazole-based curing catalyst, as the first curing catalyst, and methyl ethyl ketone as a solvent were prepared.

Thereafter, the prepared first thermosetting resin, first thermoplastic resin, first thermal curing agent, first inorganic filler, first curing catalyst, first flux agent, and solvent were mixed to obtain a first adhesive layer composition (solid content of 40% by weight). At this time, the liquid epoxy resin was included in an amount of 8.2 parts by weight, the solid epoxy resin was included in an amount of 23.7 parts by weight, the first thermoplastic resin was included in an amount of 11.5 parts by weight, the first thermal curing agent was included in an amount of 12.6 parts by weight, the first inorganic filler was included in an amount of 40 parts by weight, the first flux agent was included in an amount of 2.5 parts by weight, and the first curing catalyst was included in an amount of 1.5 parts by weight based on 100 parts by weight of the solid content (total weight of the first thermosetting resin, the first thermoplastic resin, the first thermal curing agent, the first inorganic filler, the first flux agent, and the first curing catalyst).

Preparation of First Adhesive Composition (2) to First Adhesive Composition (5)

The first adhesive compositions were prepared in the same manner as the method for preparing the first adhesive composition (1) except that the compositions were adjusted as shown in Tables 1 and 2 below.

TABLE 1

| | | First adhesive composition (1) | First adhesive composition (2) | First adhesive composition (3) |
|---|---|---|---|---|
| Thermo-setting resin | Liquid epoxy | RE-310S (8.2 parts by weight) | LX-01 (8.2 parts by weight) | LX-01 (8.2 parts by weight) |
| | Solid epoxy | EOCN-104S (23.7 parts by weight) | EOCN-104S (23.7 parts by weight) | EOCN-1020-70 (23.7 parts by weight) |
| Thermoplastic resin | | KG-3015P (11.5 parts by weight) | KG-3104 (11.5 parts by weight) | KG-3105P (5.75 parts by weight) KG-3104 (5.75 parts by weight) |
| Thermal curing agent | | KH-6021 (12.6 parts by weight) | KA-1160 (12.6 parts by weight) | KH-6021 (12.6 parts by weight) |
| Inorganic filler | | YA050C (40 parts by weight) | YA050C (20 parts by weight) SC-2050 (20 parts by weight) | SC-2050 (40 parts by weight) |
| Flux agent | | C3-CIC (2.5 parts by weight) | C3-CIC (2.5 parts by weight) | Adipic acid (2.5 parts by weight) |
| Curing catalyst | | C11Z-CN (1.5 parts by weight) | 2PZ (1.5 parts by weight) | C11Z-CN (1.5 parts by weight) |

TABLE 2

| | | First adhesive composition (4) | First adhesive composition (5) |
|---|---|---|---|
| Thermosetting resin | Liquid epoxy | RE-310S (8.2 parts by weight) | RE-310S (8.2 parts by weight) |
| | Solid epoxy | EOCN-1020-70 (23.7 parts by weight) | EOCN-104S (23.7 parts by weight) |
| Thermoplastic resin | | KG-3104 (11.5 parts by weight) | KG-3015P (11.5 parts by weight) |
| Thermal curing agent | | KA-1160 (12.6 parts by weight) | KH-6021 (12.6 parts by weight) |
| Inorganic filler | | YA050C (40 parts by weight) | SC-2050 (40 parts by weight) |
| Flux agent | | C3-CIC (2.5 parts by weight) | C3-CIC (2.5 parts by weight) |
| Curing catalyst | | 2PZ (1.5 parts by weight) | C11Z-CN (1.5 parts by weight) |

In Table 1 and Table 2, the amount of each component is based on 100 parts by weight of the solid content (total weight of the thermosetting resin, thermoplastic resin, thermal curing agent, inorganic filler, flux agent, and curing catalyst).

Preparation of Second Adhesive Compositions

Preparation of Second Adhesive Composition (1)

A second thermosetting resin was prepared by mixing RE-310S as a liquid epoxy resin and EOCN-104S as a solid epoxy resin. In addition, KG-3015, an acrylate resin, was prepared as a second thermoplastic resin, and KH-6021, a phenolic resin, was prepared as a second thermal curing agent. In addition, YA050C as a second inorganic filler, C3-CIC as a second flux agent, C11Z-CN, an imidazole-based curing catalyst, as a second curing catalyst, M300 as a photopolymerizable monomer, TPO as a photoinitiator, and methyl ethyl ketone as a solvent were prepared.

Thereafter, a second adhesive layer composition (solid content of 40% by weight) was obtained by mixing the prepared second thermosetting resin, second thermoplastic resin, second thermal curing agent, second inorganic filler, second curing catalyst, second flux agent, photopolymerizable monomer, photoinitiator, and solvent. At this time, the liquid epoxy resin was included in an amount of 7.7 parts by weight, the solid epoxy resin was included in an amount of 22.9 parts by weight, the second thermoplastic resin was included in an amount of 11.5 parts by weight, the second thermal curing agent was included in an amount of 12.6 parts by weight, the second inorganic filler was included in an amount of 40 parts by weight, the second flux agent was included in an amount of 2.5 parts by weight, the second curing catalyst was included in an amount of 1.5 parts by weight, the photopolymerizable monomer was included in an amount of 0.8 parts by weight, and the photoinitiator was included in an amount of 0.5 parts by weight based on 100 parts by weight of the solid content (total weight of the second thermosetting resin, the second thermoplastic resin, the second thermal curing agent, the second inorganic filler, the second flux agent, the second curing catalyst, the photopolymerizable monomer, and the photoinitiator).

Preparation of Second Adhesive Composition (2) to Second Adhesive Composition (5)

Second adhesive compositions were prepared in the same manner as the method for preparing the second adhesive composition (1) except that the compositions were adjusted as shown in Tables 3 and 4 below.

TABLE 3

| | | Second adhesive composition (1) | Second adhesive composition (2) | Second adhesive composition (3) |
|---|---|---|---|---|
| Thermo-setting resin | Liquid epoxy | RE-310S (7.7 parts by weight) | LX-01 (7.7 parts by weight) | LX-01 (7.7 parts by weight) |
| | Solid epoxy | EOCN-104S (22.9 parts by weight) | EOCN-104S (22.9 parts by weight) | EOCN-1020-70 (22.9 parts by weight) |
| Thermoplastic resin | | KG-3015P (11.5 parts by weight) | KG-3104 (11.5 parts by weight) | KG-3105P (5.75 parts by weight) KG-3104 (5.75 parts by weight) |
| Thermal curing agent | | KH-6021 (12.6 parts by weight) | KA-1160 (12.6 parts by weight) | KH-6021 (12.6 parts by weight) |
| Inorganic filler | | YA050C (40 parts by weight) | YA050C (20 parts by weight) SC-2050 (20 parts by weight) | SC-2050 (40 parts by weight) |
| Flux agent | | C3-CIC (2.5 parts by weight) | C3-CIC (2.5 parts by weight) | Adipic acid (2.5 parts by weight) |
| Curing catalyst | | C11Z-CN (1.5 parts by weight) | 2PZ (1.5 parts by weight) | C11Z-CN (1.5 parts by weight) |
| Photopoly-merizable monomer | | M300 (0.8 parts by weight) | M300 (0.8 parts by weight) | EM265 (0.8 parts by weight) |
| Photoinitiator | | TPO (0.5 parts by weight) | TPO (0.5 parts by weight) | TPO (0.5 parts by weight) |

TABLE 4

| | | Second adhesive composition (4) | Second adhesive composition (5) |
|---|---|---|---|
| Thermo-setting resin | Liquid epoxy | RE-310S (7.7 parts by weight) | LX-01 (7.7 parts by weight) |
| | Solid epoxy | EOCN-1020-70 (22.9 parts by weight) | EOCN-104S (22.9 parts by weight) |

TABLE 4-continued

| | Second adhesive composition (4) | Second adhesive composition (5) |
|---|---|---|
| Thermoplastic resin | KG-3104 (11.5 parts by weight) | KG-3104 (11.5 parts by weight) |
| Thermal curing agent | KA-1160 (12.6 parts by weight) | KH-6021 (12.6 parts by weight) |
| Inorganic filler | YA050C (40 parts by weight) | SC-2050 (40 parts by weight) |
| Flux agent | C3-CIC (2.5 parts by weight) | C3-CIC (2.5 parts by weight) |
| Curing catalyst | 2PZ (1.5 parts by weight) | 2PZ (1.5 parts by weight) |
| Photopolymerizable monomer | M300 (0.8 parts by weight) | M300 (0.8 parts by weight) |
| Photoinitiator | TPO (0.5 parts by weight) | TPO (0.5 parts by weight) |

In Table 3 and Table 4, the amount of each component is based on 100 parts by weight of the solid content (total weight of the thermosetting resin, thermoplastic resin, thermal curing agent, inorganic filler, flux agent, curing catalyst, photopolymerizable monomer, and photoinitiator).

Preparation of Films for Bonding Semiconductors

Example 1

After applying the first adhesive composition (1) on the release-treated PET film (release film) using a comma coater, it was dried at 120° C. for 3 minutes to form a first adhesive layer having a thickness of 10 μm. Thereafter, a second adhesive layer having a thickness of 10 μm was formed on the formed first adhesive layer using the second adhesive composition (1) in the same manner so that a film for bonding semiconductors of a double layer (first adhesive layer/second adhesive layer) having a total thickness of 20 μm was prepared on the release film.

Examples 2 to 5

As shown in Table 5 below, films for bonding semiconductors were prepared in the same manner as in Example 1 except that the double layer adhesive layer was formed in the order of the first layer and the second layer on the release film using the first adhesive composition and the second adhesive composition.

TABLE 5

| | | Example 1 | Example 2 | Example 3 | Example 4 | Example 5 |
|---|---|---|---|---|---|---|
| First layer | Composition | First adhesive layer (First adhesive composition (1)) | First adhesive layer (First adhesive composition (2)) | First adhesive layer (First adhesive composition (3)) | Second adhesive layer (Second adhesive composition (1)) | Second adhesive layer (Second adhesive composition (4)) |
| | Melt viscosity (Pa · s) | 870 | 750 | 810 | 2630 | 2430 |
| Second layer | Composition | Second adhesive layer (Second adhesive composition (1)) | Second adhesive layer (Second adhesive composition (2)) | Second adhesive layer (Second adhesive composition (3)) | First adhesive layer (First adhesive composition (1)) | First adhesive layer (First adhesive composition (4)) |
| | Melt viscosity (Pa · s) | 2630 | 2500 | 2650 | 870 | 570 |

In Table 5, "first layer" means an adhesive layer in contact with the release film, and "second layer" means an adhesive layer formed on the adhesive layer of the first layer. At this time, the melt viscosity of the second adhesive layer is one measured after irradiation with light at 1,000 mJ.

Comparative Example 1 (Double Layer Using Only First Adhesive Composition (5))

After applying the first adhesive composition (5) on the release-treated PET film (release film) using a comma coater, it was dried at 120° C. for 3 minutes to form a first adhesive layer having a thickness of 10 μm. Thereafter, a second adhesive layer having a thickness of 10 μm was formed on the formed first adhesive layer using the first adhesive composition (5) again in the same manner.

That is, a film for bonding semiconductors of a double layer (first adhesive layer/second adhesive layer) having a total thickness of 20 μm was prepared on the release film using only the first adhesive composition (5). At this time, the melt viscosities of the first adhesive layer and the second adhesive layer were 830 Pa·s, respectively.

Comparative Example 2 (Double Layer Using Only Second Adhesive Composition (5))

After applying the second adhesive composition (5) on the release-treated PET film (release film) using a comma coater, it was dried at 120° C. for 3 minutes to form a first adhesive layer having a thickness of 10 μm. Thereafter, a second adhesive layer having a thickness of 10 μm was formed on the formed first adhesive layer using the second adhesive composition (5) again in the same manner.

That is, a film for bonding semiconductors of a double layer (first adhesive layer/second adhesive layer) having a total thickness of 20 μm was prepared on the release film using only the second adhesive composition (5). At this time, the melt viscosities of the first adhesive layer and the second adhesive layer were 2,310 Pa·s, respectively. At this time, the melt viscosities of the first adhesive layer and the second adhesive layer are ones measured after irradiation with light at 1,000 mJ.

Manufacturing of Semiconductor Packages

Example 1

Prepared was a wafer containing bump chips (10.1 mm×6.6 mm), which are semiconductor elements, in which a lead-free solder was formed to a height of 9 μm on a copper pillar having a height of 10 μm and a pitch of 40 μm.

FIG. 3 is a view schematically showing a method for manufacturing a semiconductor package in Example 1 of the present disclosure.

As shown in FIG. 3, in the film 100 for bonding semiconductors prepared in Example 1, the second adhesive layer 20, which is located farthest from the release film and corresponds to the second layer exposed to the outside, was attached to the top chip 40 to carry out vacuum lamination at 50° C. on the bump 60 on which the solder 70 was formed, and photocuring was performed by irradiating light with a mercury UV lamp (DS-MUV-128) at an exposure amount of 1,000 mJ. After that, the release film 30 was removed and individualized into individual chips. Thermal compression of the individualized bump chip was carried out on a 12.1 mm×8.1 mm substrate chip which included bottom chip 50 and bump 60' and having a 40 μm pitch connection pad using a thermal compression bonder. The process conditions at this time were temporary bonding performed at a head temperature of 120° C. at 100 N for 2 seconds, and the head temperature instantaneously raised to 260° C. to perform thermal compression bonding at 200 N for 5 seconds, thereby manufacturing a semiconductor package.

Examples 2 to 5

Semiconductor packages were manufactured in the same manner as in Example 1 except that an adhesive layer corresponding to the second layer of the films for bonding semiconductors prepared in Examples 2 to 5 was attached to the top chip.

Comparative Example 1 and Comparative Example 2

Semiconductor packages were manufactured in the same manner as in Example 1 except that an adhesive layer of the films for bonding semiconductors prepared in Comparative Example 1 and Comparative Example 2 was attached to the top chip.

Semiconductor Package Quality Evaluation

Fillet Evaluation

Five semiconductor package samples manufactured by the methods of Examples 1 to 5, Comparative Example 1 and Comparative Example 2 above were each fabricated and observed from the upper side of the bump chip using an optical microscope, and the maximum length of the fillet that flowed out from the non-conductive adhesive film was measured. Thereafter, the averages and standard deviations of the maximum lengths of the fillets of the respective samples were calculated, and the results are shown in Tables 6 and 7 below.

Bonding Evaluation

For the semiconductor packages manufactured by the methods of Examples 1 to 5 and Comparative Example 1 and Comparative Example 2 above, bump (solder) bonding evaluation was performed in the following manner, and the results are shown in Tables 6 and 7 below.

The bump was exposed by cross-sectional polishing and observed under an optical microscope, and when no trapping of the adhesive composition was seen on the bump and the solder was sufficiently wet to the wiring, it was evaluated as 'O', and in other cases, it was evaluated as 'X' to show the evaluation results in Tables 6 and 7.

TABLE 6

| | | Example 1 | Example 2 | Example 3 | Example 4 | Example 5 |
|---|---|---|---|---|---|---|
| Fillet evaluation (μm) | Sample 1 | 125.8 | 137.5 | 124.5 | 145.7 | 126.8 |
| | Sample 2 | 133.3 | 120.1 | 127.4 | 140.2 | 140.1 |
| | Sample 3 | 127.1 | 125.2 | 122.2 | 137.8 | 129.5 |
| | Sample 4 | 127.3 | 125.6 | 130.2 | 139.8 | 130.2 |
| | Sample 5 | 136.1 | 126.7 | 127.5 | 139.7 | 137.8 |
| | Average | 129.92 | 127.02 | 126.36 | 140.6 | 132.88 |
| | Standard deviation | 4.51 | 6.39 | 3.08 | 2.98 | 5.74 |
| Bonding evaluation | | ○ | ○ | ○ | ○ | ○ |

TABLE 7

| | | Comparative Example 1 | Comparative Example 2 |
|---|---|---|---|
| Fillet evaluation (μm) | Sample 1 | 221.8 | 19.9 |
| | Sample 2 | 238.5 | 21.1 |
| | Sample 3 | 245.1 | 19.7 |
| | Sample 4 | 234.2 | 19.6 |
| | Sample 5 | 229.7 | 22.5 |
| | Average | 233.9 | 20.56 |
| | Standard deviation | 8.81 | 1.24 |
| Bonding evaluation | | O | X |

Referring to Table 6 and Table 7, as results of the fillet evaluation, it was confirmed that the semiconductor packages according to Examples 1 to 5 of the present disclosure can effectively control the fillet, thereby preventing breakage of bumps due to excessive fillet.

Meanwhile, the semiconductor package according to Comparative Example 1 exhibited an average fillet length of 233.9 μm, and it was confirmed that the solder was melted and fused to the chips when chips were stacked, and the fillet was excessive to cause a problem of contaminating the package. That is, it was confirmed that the semiconductor package according to Comparative Example 1 was inferior in terms of fillet control.

In addition, it was confirmed in the semiconductor package according to Comparative Example 2 that the film was hardened after photocuring so that almost no fillet came out, but the solder was not bonded to the bottom chip so that the bonding evaluation result was inferior.

Therefore, it can be seen that the quality reliability can be effectively improved since the structure of the film for bonding semiconductors according to one embodiment of the present disclosure was a two-layer structure and fabricated as a thermal curing type and a photocuring type, respectively, so that it is easy to control the fillet generated during the semiconductor packaging process while exhibiting excellent adhesive force, and the problem in which the solder is melted and fused to the chip can be prevented.

Although the present disclosure has been described by limited embodiments as described above, the present disclosure is not limited to the embodiments, and various modifications and changes will be of course made possible by those skilled in the art to which the present disclosure pertains within the equivalent scope of the technical idea of the present disclosure and claims to be described later.

DESCRIPTION OF REFERENCE NUMERALS

100: Film for bonding semiconductors
10: First adhesive layer
20: Second adhesive layer
30: Release film
40: Top chip
50: Bottom chip
60, 60': Bump
70: Solder

The invention claimed is:

1. A film for bonding semiconductors, comprising:

a first adhesive layer containing a first adhesive composition comprising a first thermosetting resin, a first thermoplastic resin, and a first thermal curing agent; and a second adhesive layer on the first adhesive layer and comprises a second adhesive composition comprising a second thermosetting resin, a second thermoplastic resin, a second thermal curing agent, a photopolymerizable monomer containing one or more photocurable functional groups, and a photoinitiator, wherein, after light is irradiated to the film for bonding semiconductors, the first adhesive layer has a melt viscosity of 100 to 2,000 Pa·s, the second adhesive layer has a melt viscosity of 200 to 5,000 Pa·s, and the first adhesive layer and the second adhesive layer have different melt viscosities.

2. The film of claim 1, wherein the photopolymerizable monomer includes a (meth)acrylate-based compound containing one or more photocurable functional groups.

3. The film of claim 1, wherein the second thermosetting resin is present in an amount of 20 parts by weight or more to 40 parts by weight or less based on 100 parts by weight of the solid content of the second adhesive composition.

4. The film of claim 1, wherein the second thermoplastic resin is present in an amount of 5 parts by weight or more to 20 parts by weight or less based on 100 parts by weight of the solid content of the second adhesive composition.

5. The film of claim 1, wherein the second thermal curing agent is present in an amount of 7.5 parts by weight or more to 17.5 parts by weight or less based on 100 parts by weight of the solid content of the second adhesive composition.

6. The film of claim 1, wherein the photopolymerizable monomer is present in an amount of 0.5 parts by weight or more to 5 parts by weight or less based on 100 parts by weight of the solid content of the second adhesive composition.

7. The film of claim 1, wherein the photoinitiator is present in an amount of 0.5 parts by weight or more to 5 parts by weight or less based on 100 parts by weight of the solid content of the second adhesive composition.

8. The film of claim 1, wherein the photoinitiator and the second thermal curing agent have a weight ratio of 1:0.5 or more to 1:50 or less.

9. The film of claim 1, wherein the first thermosetting resin and the second thermosetting resin each independently include at least one of a solid epoxy resin and a liquid epoxy resin.

10. The film of claim 1, wherein the first thermoplastic resin and the second thermoplastic resin each independently include at least one of a resin selected from among a polyimide-based resin, a polyether imide-based resin, a polyester imide-based resin, a polyamide-based resin, a polyether sulfone-based resin, a polyether ketone-based resin, a polyolefin-based resin, a polyvinyl chloride-based resin, a phenoxy-based resin, butadiene rubber, styrene-butadiene rubber, modified butadiene rubber, reactive butadiene acrylonitrile copolymer rubber, and a (meth)acrylate-based resin.

11. The film of claim 1, wherein the first adhesive composition and the second adhesive composition each independently further comprise an additive including at least one of inorganic fillers, curing catalysts, and flux agents.

12. The film of claim 1, wherein the first adhesive layer and the second adhesive layer have a thickness ratio of 1:9 to 9:1.

13. The film of claim 1, further including a release film, wherein the first adhesive layer is provided on the release film.

14. A semiconductor package, comprising the film for bonding semiconductors according to claim 1.

* * * * *